UNITED STATES PATENT OFFICE.

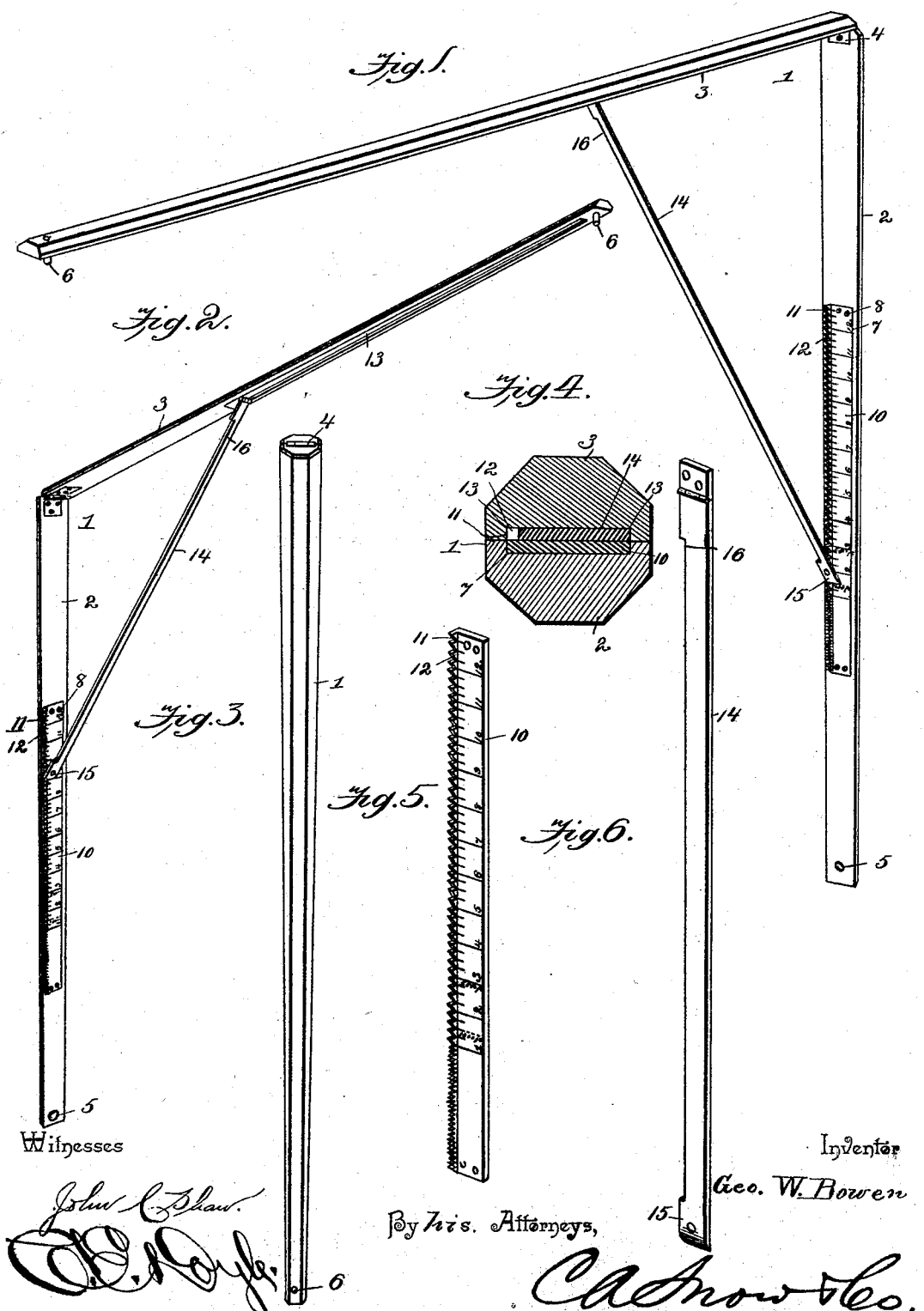

GEORGE W. BOWEN, OF FORT WAYNE, INDIANA.

COMBINED GAGE AND CANE.

SPECIFICATION forming part of Letters Patent No. 505,355, dated September 19, 1893.

Application filed February 20, 1893. Serial No. 463,090. (No model.)

*To all whom it may concern:*

Be it known that I, GEORGE W. BOWEN, a citizen of the United States, residing at Fort Wayne, in the county of Allen and State of Indiana, have invented a new and useful Combined Measuring-Instrument and Cane, of which the following is a specification.

My invention relates to a combined measuring instrument and cane or walking stick, and it has for its objects to provide a simple device capable of being carried in the hand and of performing the functions of a walking stick by which the distances and altitudes or heights of objects may be approximately obtained without elaborate calculation as by the use of the tables employed in trigonometry and surveying.

With these objects in view the invention consists in a certain novel construction and combination of devices fully described hereinafter in connection with the drawings and specifically pointed out in the appended claims.

In the drawings:—Figure 1 is a perspective view of the device embodying my invention adjusted for use in obtaining the distance to an object. Fig. 2 is a similar view of the device adjusted for use in determining the altitude or height of an object. Fig. 3 is a similar view of the device, closed, for use as a cane. Fig. 4 is a detail transverse section of the device. Figs. 5 and 6 are detail views in perspective of the gage and swinging arm, respectively.

The body of the device may be formed of wood, metal, or other preferred material, and may be cylindrical, prismatic, or slightly tapering, as shown in the drawings, Fig. 3, in exterior contour. This body-portion, 1, is divided longitudinally to form the semi-cylindrical or semi-prismatic sections, 2 and 3, which are pivotally connected by means of a hinge, 4, at or near their upper ends. The lower or free ends of said sections 2, 3, are provided with registering perforations 5 in which is fitted a transverse peg, pin or clutch 6, to hold such free ends in contact when the device is folded for use as a cane or walking stick.

The section 2, which for convenience in description I will term an upright, is provided in its inner surface with a recess or countersink 7 in which is fitted, and secured by means of screws 8, or other similar devices, a metallic scale 10, which is inscribed with linear measurements and is subdivided to indicate inches and fractions thereof. At one edge of this scale is a raised rack 11, whose teeth 12 are equally spaced and are arranged in a certain definite relation to the measurements upon the scale, as, four teeth to the inch. This proportion may be varied in different devices as may be found expedient, and a greater or less number of teeth arranged in a given space. The lower portion of the rack shown in the drawings is provided with teeth arranged at shorter intervals. It will be understood that the finer the teeth in the rack the more accurate the adjustment of the parts in taking measurements. The other member of the body-portion, designated by the numeral 3, and which I have, for convenience, termed the indicator, is provided in its inner surface with a cavity 13, and in this cavity is pivotally arranged an adjustable arm 14. This arm is pivoted at its upper end to the section 3 and is adapted, at its free end to engage one of the teeth in the rack 11, such free end being provided with a tapered edge or detent 15 for this purpose. One edge of the arm 14 is cut-away, as shown at 16, to avoid contact with the rack 11, whose teeth project outward beyond the surface of the section 2. The outer surface of the scale 10 is flush with the inner surface of the section 2 and the surface of the arm 14, when closed into the cavity 13 is flush with the inner surface of the section 3.

This being the construction of the device embodying my invention, the operation or manner of using the same is as follows: The cane or walking stick is made of a definite length; and assuming that length as a base, the scale 10 is inscribed with a series of distances or measurements corresponding respectively, with the teeth of the rack 11. These measurements may be obtained, originally, by trial; namely, by taking a known distance, placing the upright in a vertical position at one terminal of such distance or measurement, elevating the free end of the indicator, 3, until its outer surface is in a line with the other terminal of said distance or measurement, and engaging the free end of the arm 14 with a tooth of the rack which will support said indicator in that position. This tooth of the rack may then be marked or inscribed with the above-mentioned known distance or measurement. Or, taking the length of the upright as a base, and measuring the angles between the upright and the indicator at various deflections, the distance (or the length of the other side of the triangle may be calculated by reference to a table of sines and co-sines. In this way a series of teeth of the scale is inscribed with certain definite measurements, and when the parts are arranged as above described, namely, with the upright in a vertical position, the indicator directed toward a distant object, (whose distance it is desired to ascertain) and the free end of the arm in a tooth of the rack, the measurement opposite said tooth will indicate the distance of the object from the observer.

To obtain altitudes or heights the indicator is elevated above the horizontal, or at greater than a right angle from the upright, and is directed toward the object whose altitude or height is desired, the free end of the arm being engaged with the rack.

The teeth of the rack which are within the reach of the free end of the arm, when the indicator is above the horizontal position, are inscribed with certain definite measurements, as above described. These measurements may be obtained as above described, assuming a base of a certain length, which assumed base must be measured in a horizontal plane and the upright must be placed at the distance of the length of such base from the object whose height is to be ascertained. When such base cannot be accurately laid off, and must be made longer or shorter, due allowance in proportion must be made for such variation.

The device as described may be used in obtaining distances and heights upon land or water, and while not as accurate as the surveying and other instruments employed in scientific measurements, it can be used with approximate correctness, sufficient for the purposes of tourists and others desiring such information as may be obtained thereby.

Changes in the form, proportion and minor details of construction may be resorted to without departing from the spirit or sacrificing any of the advantages of this invention.

Having thus described my invention, what I claim, and desire to secure by Letters Patent, is—

1. A device of the class described having duplicate members pivotally connected at or near one end, a scale carried by one of the members, and an arm pivotally connected to the other member and adapted to travel at its free end over said scale, substantially as specified.

2. A device of the class described having duplicate members of a definite length pivotally connected at or near one end, a scale carried by one of the members, and an arm pivotally connected to the other member to engage said scale, substantially as specified.

3. A combined measuring instrument and cane having a body-portion comprising duplicate members provided respectively with a scale, and a swinging arm to engage said scale, substantially as specified.

4. In a device of the class described, the combination of duplicate members, a scale and adjacent rack attached to one of the members, and an arm pivotally connected to the other member to engage said rack, substantially as specified.

In testimony that I claim the foregoing as my own I have hereto affixed my signature in the presence of two witnesses.

GEORGE W. BOWEN.

Witnesses:
HENRY H. BOSSLER,
JAMES E. GRAHAM.